United States Patent [19]
Boss

[11] 3,880,190
[45] Apr. 29, 1975

[54] TIMED FLUID VALVE

[75] Inventor: Gary R. Boss, New Berlin, Wis.

[73] Assignee: Erie Manufacturing Company, Milwaukee, Wis.

[22] Filed: May 31, 1973

[21] Appl. No.: 365,561

[52] U.S. Cl. .............................. 137/624.12; 74/3.5
[51] Int. Cl. ...................... F16k 21/06; F16k 31/48
[58] Field of Search..... 137/624.11, 624.12, 624.21, 137/624.22; 74/3.54, 3.5

[56] References Cited
UNITED STATES PATENTS
2,995,150  8/1961  Engholdt ........................ 137/624.11
3,024,812  3/1962  Bydalek ......................... 137/624.11

Primary Examiner—Alan Cohan
Attorney, Agent, or Firm—Michael, Best & Friedrich

[57] ABSTRACT

A timed fluid valve including a body having an inlet and outlet and a valve controlling flow between the inlet and outlet. A timer means is mounted on the body and has a timer shaft associated therewith which is adapted for both rotary and axial movement. A valve actuating mechanism is operatively connected to the valve and operatively connected to the timer shaft. The valve actuating mechanism includes a first cam member operatively connected to the timer means and a second cam member operatively connected to the valve. The first cam member is operable to actuate the second cam only after the timer means has been actuated to a predetermined minimum time setting and only operative to retain the valve in fully open position for the minimum time period. The valve actuating mechanism is further operative to fully close the valve instantaneously after the predetermined minimum time period has elapsed. A shaft actuating knob is connected to the timer shaft through one-way clutch whereby the timer can be actuated by the knob only in the direction for setting the timer and opening valve. The timer shaft is adapted for both rotatable movement and axial movement. It is first rotated to position the first cam member to the desired time setting and is then actuated in an axial direction to cause said first cam member to contact said second cam member and thereby move the valve to its fully open position where it is retained until the minimum time period has elapsed.

8 Claims, 4 Drawing Figures

TIMED FLUID VALVE

BACKGROUND OF THE INVENTION

1. Field of the Invention

This invention relates to timed fluid valves and more particularly to timed valves adapted for controlling the operation of a gas incinerator or other similar device.

2. Description of the Prior Art.

The most pertinent prior art known to applicant is the clock controlled gas valve shown in U.S. Pat. No. 2,995,150. The valve shown therein has two major disadvantages which have been eliminated by the present invention. The first disadvantage is the fact that the valve shown in such patent can be opened and closed gradually which means that the valve can assume a position intermediate its fully open and fully closed position which is undesirable from an operational standpoint. The second disadvantage is the possibility of short-cycling the valve by gripping the disc member 76 shown therein and causing it to be rotated to the off position. As will be explained, both of these disadvantages are eliminated in the construction of the present invention.

SUMMARY OF THE INVENTION

A timed fluid valve comprising a body having an inlet and outlet and a valve for controlling flow between the inlet and outlet. A timer means is mounted on the valve body and has a timer shaft adapted for both rotary and axial movement. A valve actuating means is operatively connected to the valve means and also operatively connected to the timer means by the timer shaft. The valve actuating means is operative to open the valve only after the timer has been actuated to a predetermined minimum time setting and is further operative to retain the valve means in fully open position for the minimum time period. The valve actuating means is further operative to provide a minimum degree of valve opening to the valve means before it is effective to retain the valve means in its open position and is also adapted to fully close the valve instantaneously after the predetermined minimum time period has elapsed. An actuating means including an operating knob is connected to the timer shaft through a one-way clutch. An indicator disc is mounted directly on the timer shaft under the face of the knob. The knob has a depending skirt which extends downwardly around the indicator disc to thereby prevent the operator from gripping the disc and rotating the timer shaft in the off direction. The face of the knob is made of transparent material so that the indicator disc can be viewed therethrough by the operator.

DESCRIPTION OF THE PREFERRED EMBODIMENT

Figure 1:
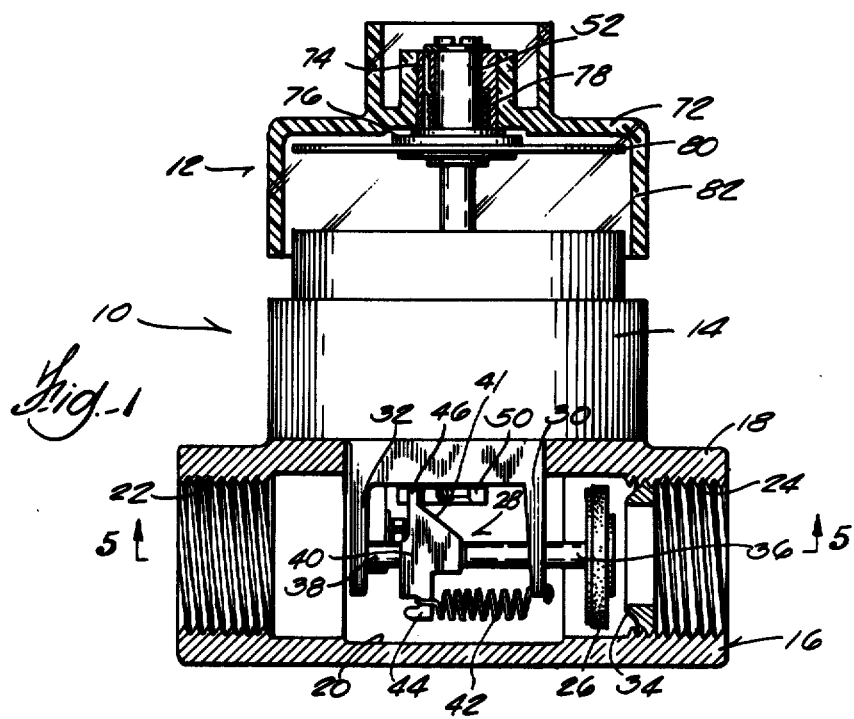
FIG. 1 is a partially sectioned side elevation view of a timed fluid valve embodying the present invention.

Referring to the drawings in detail, FIG. 1 shows a timed fluid valve 10 comprising a knob assembly 12, a timer housing 14 and a valve mechanism 16. A spring operated timer clock mechanism (not shown) of any desired construction is mounted inside housing 14.

Valve mechanism 16 is comprised of a valve body 18 having a chamber 20 therein with an inlet 22 and an outlet 24. A valve member 26 is mounted on a valve stem assembly 28 which in turn is slidably mounted in chamber 20 by means of support ears 30, 32 which project from the bottom face of timer housing 14. A valve seat 34 is formed at outlet 24 which cooperates with valve member 26 to control flow of fluid through valve body 18.

Figures 2, 3:
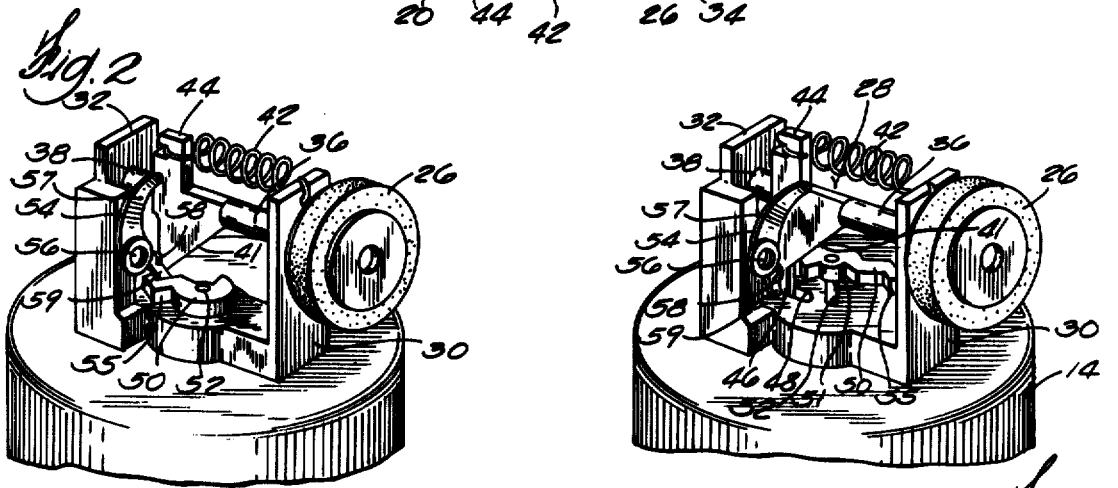
FIG. 2 is a fragmentary perspective view of the valve mechanism of the present invention with the valve body removed.
FIG. 3 is a view similar to FIG. 2 but showing the valve member actuated to its open position.

Valve stem assembly 28 is comprised of a pair of shaft members 36, 38 slidably mounted in ears 30, 32 respectively, and a cam member 40. Shaft members 36, 38 are fastened to opposite ends of cam member 40 by threaded connections (FIG. 4) to provide a unitary stem assembly 28. Cam member 40 is provided with an inclined cam surface 41 on the underside thereof, the function of which will be explained hereinafter. Valve member 26 is biased to its closed position by a tension spring 42 fastened between the end of ear 30 and a lug 44 formed on the upper end of cam member 40. As best shown in FIG. 3, a depending foot 46 is formed on the lower end of cam memmber 40 for engagement in a groove 48 to thereby provide a guide means for the slidable valve assembly 28.

Figure 4:
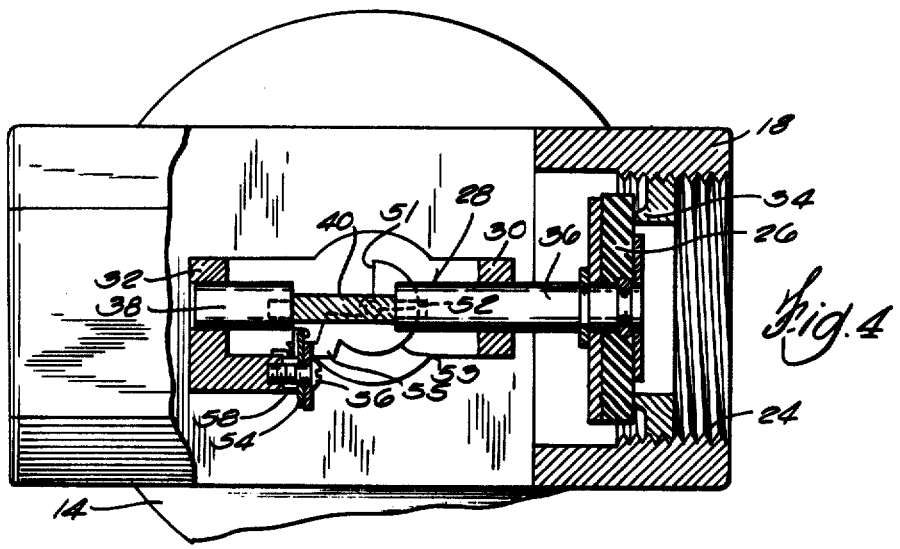
FIG. 4 is a sectional view taken along line 5—5 of FIG. 1 (except that the valve is shown in its closed position).

The valve mechanism 16 further includes a rotatable cam member 50 mounted on the end of timer shaft 52 and a locking finger 54 pivotally mounted on ear 32 by means of a metal screw 56. Finger 54 has a retaining nose portion 57 and a release leg portion 59 and is biased into its valve retaining position by a coil spring member 58. As best shown in FIG. 4, cam member 50 is provided with a cut out portion 51, a circular edge portion 53 and a tripping leg portion 55, the function of which will be explained hereinafter.

Knob assembly 12 is comprised of an operating knob 72 connected to timer shaft 52 by a one way clutch of any conventional design such as that shown in FIG. 1. The knob has a press fit on a sleeve 74 which is journaled on a flanged bushing 76 which in turn is mounted in nonrotatable relationship on the end of shaft 52. The knob and sleeve also seat on the flange of bushing 76. Sleeve 74 serves to anchor one end of a spring 78 coiled closely around the bushing so rotation of the knob 72 in one direction acts to tighten or wind up the spring coils on the bushing 76 to effect a driving connection between the knob and the shaft. Reverse rotation of the knob relieves the coils (or unwinds the coils) sufficiently to prevent transmission of rotary motion to the shaft. An indicator disc 80 is mounted on shaft 52 directly under the face of knob 72. At least the face of knob 72 is made of transparent material so that the disc 80 can be seen by the operator. Knob 72 is provided with a depending skirt portion 82 which extends downwardly around disc 80 to thereby prevent anyone from gripping the disc and rotating the shaft in the timer off direction as will be more fully set forth hereinafter.

OPERATION

To place the valve in operation, knob 72 is rotated in the timer operated direction (generally clockwise). Such rotation will cause shaft 52 to be rotated which in turn will wind the timer mechanism in housing 14. Such rotation will also cause cam 50 to be rotated from its off position as shown in FIG. 2. The rotation of knob 72 is followed by an axial depression of the knob by the operator which will cause cam 50 to be moved axially to the position shown in FIG. 3. If the degree of rotation of cam 50 has been of a sufficient amount, the circular edge portion 53 of cam 50 will make contact with cam surface 41 of cam 40 as knob 72 is depressed, to thereby cause valve member 26 to be moved axially in its valve opening direction. The valve 26 will be retained in a fully open position by the retaining nose portion 57 of locking finger 54 as shown in FIGS. 1 and 3. The nose 57 of locking finger 54 will snap into engagement with the edge of leg 44 under the bias of spring 58 to thereby hold the valve in open position. It is important to note at this point that locking nose 57 of finger 54 will operate to retain the valve in open position only when the valve 26 has been moved a predetermined distance from its seat 34. The valve will remain in open position until cam 50 is rotated back to its start or off position (FIG. 2) by the operation of the timer clock mechanism. When cam 50 is returned to its start or off position, the tripping leg 55 thereon will engage the release leg portion 59 of finger 54 causing the finger to pivot against the bias of spring 58 to its non-retaining position as shown in FIG. 2. Valve 26 will then be snapped to its off or closed position by the bias of spring 42. Thus it is noted that with the valve mechanism of this invention the valve member 26 is always in either a fully open or a fully closed position, there being no intermediate position possible.

From the foregoing it will be appreciated that the above described valve mechanism is capable of performing a useful control function. Assume, for example, that the timed fluid valve of this invention was installed in a gas fired incinerator to control the flow of gas to the burner. Further assume that it was desired that such valve, when operated to its fully open position, would remain in such position for a certain minimum period of time after which it will be automatically and instantaneously returned to a fully closed position. When it is desired to operate the incinerator, knob 72 is rotated to the desired operating period as indicated in disc 80. The knob is then depressed, causing the valve to open in the manner described above. The incinerator will operate for the pre-set period of time set by the operator and will then shut off automatically and instantaneously in the manner described above. The valve mechanism is designed so that a certain minimum degree of timer shaft rotation is necessary before the axial movement of shaft 52 will be effective to actuate valve 26 to its open position. This is because of the particular design cooperation between cam members 50 and 40 wherein axial movement of cam 50 is effective to actuate cam 40 only if it is rotated sufficiently to position cam surface 53 thereon for contact with cam surface 41. The degree of rotation required to achieve a valve opening action will depend on the size of cut out portion 51 of cam 50. The greater the number of degrees of the cam edge 53 has been cut out, the longer the built-in "minimum open time" will be provided by the valve. As indicated previously, such a built-in "minimum open time" for an incinerator, for example, will insure complete combustion of the waste materials to be incinerated and thus minimize pollution of the atmosphere.

The valve is also designed so that valve member 26 will be moved a certain minimum distance from seat 34 before it will become retained in its open position. It is also designed so that when the predetermined open time expires the valve will close instantaneously.

Finally, it is noted that by providing the depending skirt portion 82 on knob 72, the operator cannot "cheat" the mechanism by gripping indicator disc 80 and causing the valve to close before the predetermined minimum time period referred to above has elapsed.

I claim:

1. A timed fluid valve comprising:
a body having an inlet and an outlet;
a valve means controlling flow between the inlet and outlet;
a timer means mounted on said body and having a timer shaft associated therewith;
a valve actuating means operatively connected to said valve means and operatively connected to said timer means, said valve actuating means operative to open said valve means only after said timer means has been actuated to a predetermined minimum time setting and further operative to retain said valve means in fully open position for said minimum time period, said valve actuating means further operative to provide a minimum degree of valve opening movement to the valve means before it is effective to retain the valve means in its open position, said minimum degree being the fully open position said valve actuating means being further operative to fully close said valve means instantaneously after said predetermined minimum time period has elapsed; and
an acutating means connected to said timer shaft through a one-way clutch means whereby the timer means can be actuated by the actuating means only in the direction for setting the timer and opening said valve means.

2. A timed fluid valve according to claim 1 in which said valve actuating mechanism includes a first cam means operatively connected to said timer means and a second cam means operatively connected to said valve means, said first cam member operable to actuate the second cam only after said timer means has been actuated to a predetermined minimum time setting.

3. A timed fluid valve according to claim 2 in which said valve actuating means further includes a pivotally mounted spring loaded retaining arm and a cooperating abutment on said second cam means, said retaining arm operative to engage said abutment to thereby hold said valve means in open position.

4. A timed fluid valve according to claim 3 in which said first cam means includes a rotatable cam member mounted on one end of said timer shaft, said rotatable cam member having a cut out portion, a circular edge portion and a tripping leg portion, said tripping leg portion adapted to actuate said pivotally mounted spring loaded retaining arm to disengage said arm from said abutment on said second cam means and to thereby allow the valve means to move to its closed position.

5. A timed fluid valve according to claim 4 in which said timer shaft is adapted for axial movement, which axial movement will cause said rotatable cam member of said first cam means to actuate said second cam means to its valve opening position after said timer means has been rotated to a predetermined minimum time setting.

6. A timed fluid valve according to claim 5 in which said axial movement of said timer shaft will cause said circular edge portion of said rotatable cam member to engage said second cam means and thereby actuate said valve means to its open position.

7. A timed fluid valve according to claim 1 in which said actuating means includes an operating knob connected to said timer shaft through said one-way clutch means and an indicator disc mounted directly on said timer shaft directly under the face of said knob, said knob having a depending skirt which extends downwardly around said indicator disc to thereby prevent the operator from gripping the disc and rotating the timer shaft in the off direction.

8. A timed fluid valve according to claim 7 in which at least the face of said knob is made of transparent material so that said indicator disc can be seen by the operator.

* * * * *